June 2, 1953  E. H. ALDEBORGH  2,640,270
LOCKING MEANS FOR SNAP GAUGE MEASURING PINS
Filed Nov. 25, 1949
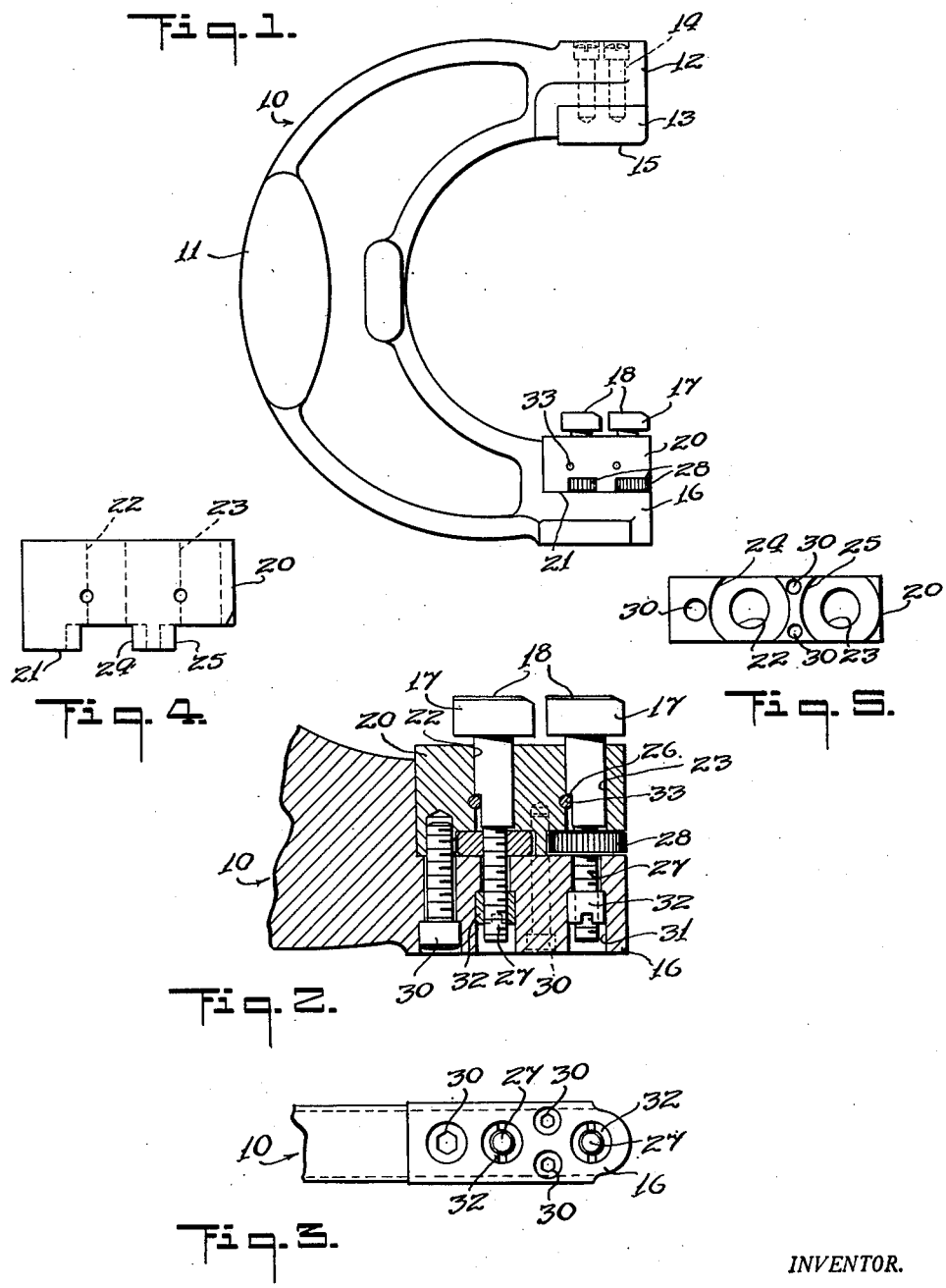
INVENTOR.
ERIK H. ALDEBORGH
BY Darby & Darby
ATTORNEYS

UNITED STATES PATENT OFFICE 2,640,270

LOCKING MEANS FOR SNAP GAUGE MEASURING PINS

Erik H. Aldeborgh, Poughkeepsie, N. Y., assignor to Standard Gage Company, Inc., Poughkeepsie, N. Y., a corporation of New York Application November 25, 1949, Serial No. 129,273

3 Claims. (Cl. 33—168)

The present invention relates to a means for locking the measuring pins of adjustable limit snap gages in their set position.

In the past it has been common practice to lock the adjustable pins of snap gages of the type mentioned in position by means of a locking screw cooperating with a pair of wedging members all assembled in a bore adjacent the pin bore but at right angles thereto with the wedging members cooperating with flat areas of the gaging pin.

This arrangement which has come to be known as the American gage design locking device exerts a satisfactory locking action. However, it tends to place stresses on the gage frame which result in shifting the gaging pins so that their plane surfaces are no longer parallel to the opposed plane surface of the gaging anvil. As a result of this the accuracy of the gage is affected and particularly is it true when measurements are attempted to be made which are of the order of 10,000ths of an inch (0.0001″).

My present device provides a means for locking the engaging pins of adjustable limit snap gages in position without so stressing the frame as to render the gage surface non-parallel and the gaging consequently inaccurate.

It is an object of the present invention to provide a novel locking means for the gaging pins of adjustable limit snap gages.

It is another object of the invention to provide such a device which eliminates any stressing of the gage frame and consequent mis-alinement of the gage pins.

It is still another object of the invention to provide a means whereby the gaging pins of adjustable snap gage may be readily set to the desired adjusted position and may be rigidly clamped in that adjusted position.

It is a still further object of the invention to provide a locking means for gaging pins of the type above-mentioned which shall be simple and economical to manufacture and readily used.

Other objects and features of the invention will appear when the following description is considered in connection with the appended drawings, in which, Figure 1 is a side elevation of an adjustable limit snap gage utilizing the locking means of my present invention;

Figure 2 is a fragmentary cross-sectional view of the lower extremity of the gage frame showing the mode in which the gaging pins are adjustably positioned therein and showing likewise the locking means of my present invention;

Figure 3 is a bottom elevation of the portion of a device illustrated in Figure 2;

Figure 4 is a side elevation of a portion of the gaging pin supporting block; and Figure 5 is a bottom elevational view of the block of Figure 4.

Referring now to the drawings, there is shown at 10 the usual U-shaped snap gage frame having a handle thereon at 11, the frame being supplied at its extremity 12 with a gaging anvil 13 fixed to the frame 12 in any suitable manner as for example by means of the screws 14. As will be readily understood, the anvil 13 is provided with a flat lapped surface 15 which cooperates with the gaging pins in performing the gaging operation.

The above-described construction is that commonly used; my invention relates to the means for locking the gaging pins which cooperate with the anvil 15 in their adjusted position.

In the other extremity 16 of frame 10 the gaging pins 17 are mounted, it being essential that the plane upper surfaces 18 of these gaging pins be parallel to the surface 15 of the gaging anvil. In order to accomplish this and to provide a locking means for the adjustable gaging pins 17, I provide a block 20 which block seats in a machined recess 21 in the lower extremity 16 of the frame 10. The block 20 is finished so that its lower surface 21 is a plane surface.

Likewise, the upper surface of the extremity 16 remaining after the provision of the recess 21 is a flat plane surface. The block 20 is provided with two bores 22 and 23 which bores are perpendicular to the surface 21. In the bores 22 and 23 the gaging pins 17 are located, these pins being of course provided with plane surfaces 18 which, due to the construction described, are parallel with the surface 15 of anvil 13. The block 20 is provided on its under surface with the two generally circular recesses 24 and 25, the recess 25, however, extending to the edge of the block as clearly seen in Figures 2, 4 and 5.

Gaging pins 17 are provided with a shouldered portion 26 and with a concentric threaded portion 27. The gaging pins 17 are inserted in the block and knurled nuts 28 threaded thereupon after which the block 20 is positioned upon the frame extremity 16 and fastened in position by means of the screws 30 which extend upwardly through bores in the extremity 16 and threaded into tapped holes in the block 20.

As will be obvious, the lower threaded portions 27 of the pins 17 extend into bores 31 in the extremity 30. At their lower ends the bores 31 are enlarged to provide space for locking nuts 32 which engage the lower threaded portions 27 of pins 17. The rotational movement of the pins 17 is limited by means of small pins 33 which extend transversely of the block 20 and project into the bores 22 and 23, thereby cooperating with the flats formed on the upper, larger portions of the pins 17.

By means of the construction mentioned it is possible to lock the gage in an adjusted position by tightening the nuts 32 which then clamp the threaded portion 27 of the gaging pins 17 rigidly since they tend to compress the extremity of the gage between the nuts 32 and the knurled nuts 28. Since the clamping action exerts a force in line with the axis of the gaging pins there is no tendency to cause a tipping of those pins and consequent lack of parallelism between the gaging pin faces and the anvil face. It should be mentioned at this point that the under surfaces of the knurled nuts 28 are finished so that they are a flat surface. Thus assuring that when the locking nuts 32 are tightened the gaging pins will be so located that their faces always remain parallel to the anvil face 15.

As will be obvious from the above, the heights of the two gaging pins are adjusted by loosening the nuts 32 and turning the knurled nuts 28 until the individual gaging pin heights are those desired and then locking the pins in their set position by tightening the respective nuts 32.

While I have described the preferred form of my invention, it will be understood that many modifications of the structure may be made within the scope of the invention. Therefore I wish to be limited not by the foregoing description, but on the contrary, solely by the claims granted to me.

What is claimed is:

1. A mounting and locking means for a gaging pin of an adjustable limit snap gage of the type having a U-shaped frame with a plane faced anvil mounted in one extremity of the frame and cooperating gaging pins mounted in the opposed extremity, comprising: a gaging pin; a block mounted on one extremity of the gage frame and serving as a mounting for the gaging pin; said block having a bore therein perpendicular to the anvil face, a shank on the gaging pin fitting said bore, a threaded extension on said gaging pin shank, a shouldered bore in the gage extremity in alinement with said block bore, said shouldered bore forming a clearance for said threaded shank extension, and locking means comprising a pair of nuts threaded on said threaded shank extension, one of said nuts lying against the shoulder in said bore, and the other of the nuts lying against the opposite face of said extremity and clamping the threaded shank in adjusted position with respect to said extremity, said block and the anvil.

2. In a mounting and locking means for a gaging pin of an adjustable limit snap gage of the type having a frame with a plane faced anvil and cooperating gaging pins mounted in opposed frame extremities, in combination, a gaging pin, a block mounted on one extremity of the gage frame and serving as a mounting for the gaging pin, said block having a bore therein perpendicular to the anvil face, a recess in the face of said block adjacent the gage frame; said access being coaxial with said bore, an alined shouldered bore in said gage frame, a shank on the gaging pin, said shank extending through said block bore and having a threaded extension extending into said frame bore, adjusting means threaded on said extension and lying in said recess, and locking means threaded on said pin shank extension and lying against said frame bore shoulder whereby the position of the pin may be adjusted by said adjusting means and set by tightening said locking means to compress the frame material between said adjusting means and said locking means.

3. In a mounting and locking means for a gaging pin of an adjustable limit snap gage of the type, having a frame with a plane faced anvil and cooperating gaging pins mounted in opposed frame extremities, in combination, a gaging pin, a block mounted on one extremity of the gage frame and serving as a mounting for the gaging pin, said block having a bore therein perpendicular to the anvil face, a recess in the face of said block adjacent the gage frame; said recess being coaxial with said bore, an alined shouldered bore in said gage frame, a shank on the gaging pin, said shank extending through said block bore and having a threaded extension extending into said frame bore, adjusting means threaded on said extension and lying in said recess, and a nut threaded on said pin shank extension and lying against said frame bore shoulder whereby the position of the pin may be adjusted by said adjusting means and set by tightening said locking means to compress the frame material between said adjusting means and said locking means.

ERIK H. ALDEBORGH.

References Cited in the file of this patent.

UNITED STATES PATENTS

| Number | Name | Date |
|---|---|---|
| 1,470,802 | Blood | Oct. 16, 1923 |
| 1,571,314 | Blood | Feb. 2, 1926 |
| 2,201,832 | Kaehlert | May 21, 1940 |

FOREIGN PATENTS

| Number | Country | Date |
|---|---|---|
| 522,139 | France | Mar. 22, 1921 |